United States Patent [19]

Otten et al.

[11] Patent Number: 4,585,909
[45] Date of Patent: Apr. 29, 1986

[54] TRANSMISSION CIRCUIT FOR A DTMF-TELEPHONE SET

[75] Inventors: Henricus J. M. Otten; Frederik Van Dongen; Josephus J. A. Geboers, all of Eindhoven, Netherlands

[73] Assignee: U.S. Philips Corporation, New York, N.Y.

[21] Appl. No.: 594,181

[22] Filed: Mar. 28, 1984

[30] Foreign Application Priority Data

Apr. 19, 1983 [NL] Netherlands ............ 8301366

[51] Int. Cl.$^4$ ............................................. H04M 1/26
[52] U.S. Cl. ............................................. 179/84 VF
[58] Field of Search .............. 179/84 VF, 84 T, 84 A, 179/84 R, 81 R; 340/365 S; 328/14, 18

[56] References Cited

U.S. PATENT DOCUMENTS 3,832,639 8/1974 Janssen ............................. 328/14

Primary Examiner—James L. Dwyer
Attorney, Agent, or Firm—Thomas A. Briody; William J. Streeter; Leroy Eason

[57] ABSTRACT

Transmission circuit for a telephone set for DTMF-tone selection. The required second-order tone filter is formed by arranging the speech filter (12) during the dialling procedure in series with a fixed first-order tone filter (10) by means of a switch (11). The resultant attenuation of the group II of high frequencies of the dialling tones is compensated for by increasing the amplitude of the dialling tones of the high-frequency group II and by an additional increase in the sub-group II(2) of the two highest frequencies of this group.

6 Claims, 3 Drawing Figures

TRANSMISSION CIRCUIT FOR A DTMF-TELEPHONE SET

BACKGROUND OF THE INVENTION

1. Field of the Invention

The invention relates to a transmission circuit for a telephone set, comprising a tone generator for generating two groups of dialling tones, the tones of the first group all having a lower frequency than the tones of the second group, having directly connected thereto a passive first-order low-pass tone filter, the transmission circuit comprising a microphone amplifier for amplifying the speech signal and a passive first-order low-pass speech filter for limiting the frequency band of the speech signal, the transmission circuit further comprising a switch for selectively connecting the input of the speech filter to the output of the tone filter or of the microphone amplifier.

2. Description of the Related Art

Such a transmission circuit is disclosed in the periodical "Electronic Components and Applications", February 1982, pages 89 to 99.

A system of dialling in which the number to be dialled is represented by a signal formed by a tone from the first group and a tone from the second group is known as a DTMF-dialling system.

In order to satisfy the CCITT and CEPT requirements as regards the attenuation of the higher harmonics produced during the generation of the tones, DTMF-transmission circuits must be provided with a second or higher-order filter arranged in series with the tone generator generating the tones. In prior art transmission circuits it is customary to choose a second-order active Butterworth filter, for example a Sallen & Key filter for this purpose.

To obtain the required frequency dependence of the filter attenuation it is necessary that the amplifier of the active filter has a low output impedance at all frequencies. At high frequencies this is only possible with a comparatively high current consumption of the amplifier, which is disadvantageous, particularly for an amplifier in an integrated circuit. In addition, when the transmission circuit is constructed in integrated circuit form the integrated circuit requires an additional connecting pin for connecting the external filter components to this amplifier, which is also a disadvantage.

The transmission circuit disclosed in the said Periodical "Electronic Components and Applications" does not comprise an active second-order filter, so that this circuit does not have the two above-mentioned disadvantages. In the transmission circuit described in this periodical, filtering of the dialling tones is effected with the aid of a second-order passive filter which is formed by a series arrangement of a first-order passive tone filter and a first-order passive speech filter provided for filtering the microphone signal, which series arrangement is exclusively used during dialling. This mode of filtering does not require a separate second-order tone filter in addition to the speech filter. Now, instead of a second-order tone filter the first-order tone filter is sufficient, which is advantageous more specifically when integrated circuits are used.

When assembling the second-order tone filter from the two first-order filters the problem is that the speech filter has a cut-off frequency which is considerably higher than the cut-off frequency of the second-order tone filter, which latter cut-off frequency is desired for attenuating the higher harmonics. In order to realize the desired second-order cut-off frequency all the same, the first-order tone filter must have a considerably lower cut-off frequency than the desired second-order cut-off frequency. Because of this comparatively low cut-off frequency of the first-order tone filter the dialling tones do however no longer satisfy the CCITT and CEPT requirements as regards their levels.

SUMMARY OF THE INVENTION

The invention has for its object to provide a transmission circuit of the type set forth in the opening paragraph, the second-order tone filter being assembled from the speech filter and the first order tone filter, the transmission circuit producing DTMF-tones which do indeed satisfy the requirements imposed on their level.

According to the invention, the transmission circuit is therefore characterized in that to compensate to a predominant extent the amplitude difference between the tones of the two groups in response to the frequency variation of the attenuation of the series arrangement of the speech filter and the tone filter the tone generator generates the tones of the second group with a greater amplitude than the tones of the first group.

BRIEF DESCRIPTION OF THE DRAWINGS

The invention will now be described in greater detail by way of example with reference to the accompanying Figures, corresponding components in the different Figures being denoted by the same reference numerals. Herein.

DESCRIPTION OF THE PREFERRED EMBODIMENTS

Figure 1:
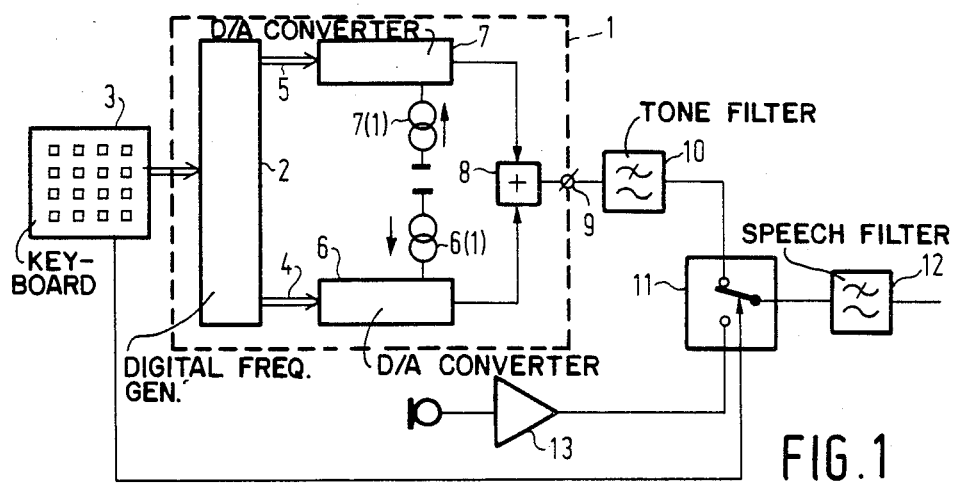
FIG. 1 shows a transmission circuit for a telephone set for DTMF-tone selection.

FIG. 1 shows a circuit diagram of a transmission circuit for a telephone set which transmission circuit selectively produces a DTMF-tone dialling signal or a speech signal.

The transmission circuit comprises a tone generator which produces a signal consisting of the sum of two dialling tones of different frequencies.

The first dialling tone has a frequency belonging to a group I of comparatively low frequencies, the second dialling tone has a frequency belonging to a group II of comparatively high frequencies. The frequencies from the group I of comparatively low frequencies are lower than those from the group II of comparatively high frequencies.

The tone generator 1 comprises a digital frequency generator 2 which is controlled by a keyboard 3. For the structure and mode of operation of this frequency generator 2 reference is made to the above-mentioned periodical and to U.S. Pat. No. 3,832,639. When a key on the keyboard 3 is depressed, the frequency generator 2 produces digital signals which together represent the two dialling tones. The digital signals representing the lowest frequency are generated on output lines 4, the digital signals which represent the highest frequency are generated on output lines 5. The digital signals are converted by digital-to-analog converters 6 and 7, respectively into analog tone signals which are thereafter applied to output 9 of tone generator 1 via an adder circuit 8.

The signal generated by the tone generator 1 must be filtered by a second-order filter so as to satisfy the CCITT and CEPT requirements as regards the higher harmonics. With this filter an attenuation of at least 40 dB per decade for the higher harmonics of the two dialling tones above 4000 Hz must be realized.

The required second-order filtering is accomplished by a series arrangement of two first-order filters 10 and 12. Filter 10 is a first-order low-pass tone filter whose input is directly connected to the output of adder circuit 8. The output of filter 10 is connected to an input of a switch 11 whose other input is connected to the output of a microphone amplifier 13. The output of switch 11 is connected to the input of filter 12.

Filter 12 is a first-order low-pass speech filter. In speech conditions the speech filter is connected via switch 11 to the output of microphone amplifier 13 to limit the bandwidth of the speech signal. The cut-off frequency of this filter is located above 3400 Hz and has, for example, a value of 4000 Hz, which is the customary value therefor.

During the generation of dialling tones switch 11 is maintained in the position shown in FIG. 1 under the control of keyboard 3. As a result thereof the two filters 10 and 12 are arranged in series with each other and thus form a second-order filter with which the required filtering of the dialling tones can be effected.

The desired cut-off frequency of the second-order filter depends on the desired attenuation of the higher harmonics. For frequencies above 4000 Hz the combination formed by the two filters 10 and 12 is equivalent to a second-order Butterworth filter having a cut-off frequency at the costomary value of 2700 Hz.

If the cut-off frequencies of the filter 12 and of the second-order filter formed by the filters 10 and 12 have predetermined values also the cut-off frequency of filter 10 has a predetermined value. At the above-mentioned value of 4000 Hz for the cut-off frequency of filter 12 it has been found that the cut-off frequency of filter 10 must be approximately 1800 Hz in order to obtain a cut-off frequency of 2700 Hz for the second-order filter.

Figure 2:
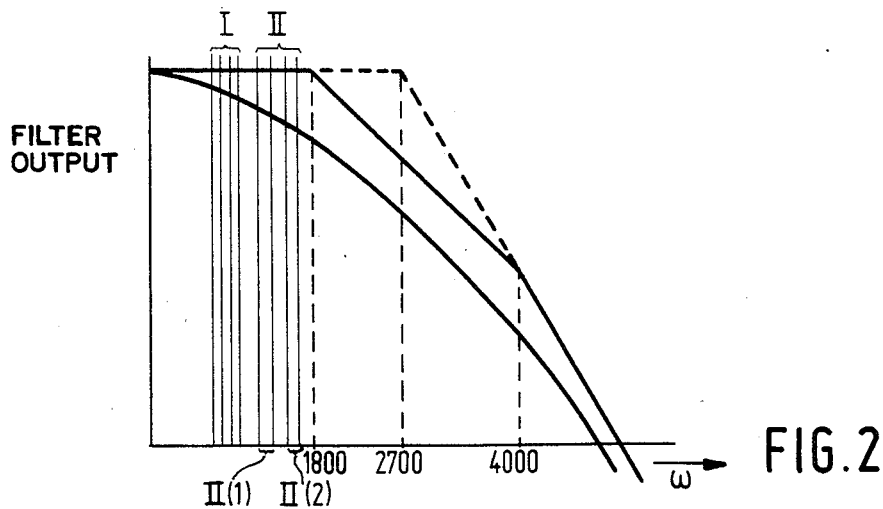
FIG. 2 is a graph illustrating the relationship between the filter attenuation and the frequency.

FIG. 2 shows the variation of the attenuation of the series arrangements of the filters 10 and 12 in dependence on the frequency. The straight lines illustrate the variation of the asymptotes of the filter characteristic; the curved line shows the actual variation of the filter attenuation. FIG. 2 also shows the frequencyies of the dialling tones of the first group I and the second group II of the DTMF-tone selection.

FIG. 2 clearly shows the higher attenuation of the signals of the second group II compared with those of the first group I. The Figure also shows the higher attenuation of the two high frequencies II(2) from the second group relative to the two low frequencies II(1) from the same group. These attenuation differences are unwanted as they render the detection of the dialling tones at the exchange end of the subscriber line more difficult.

The amplitudes of the two groups I, II of dialling tones produced by the digital-to-analog converters 6 and 7, respectively are determined by the value of a reference current produced by respective reference current sources 6(1) and 7(1) of the relevant digital-to-analog converters. So as to compensate for the attenuation differences between the tones of the two groups I, II, which differences are caused by the filtering action, the current source 7(1) of digital-to-analog converter 7 is adjusted to a higher reference current value than current source 6(1) of digital-to-analog converter 6, according to an embodiment of the invention. The amplitudes of the dialling tones produced by digital-to-analog converter 7 consequently exceeds the amplitude of the dialling tones produced by digital-to-analog converter 6.

Figure 3:
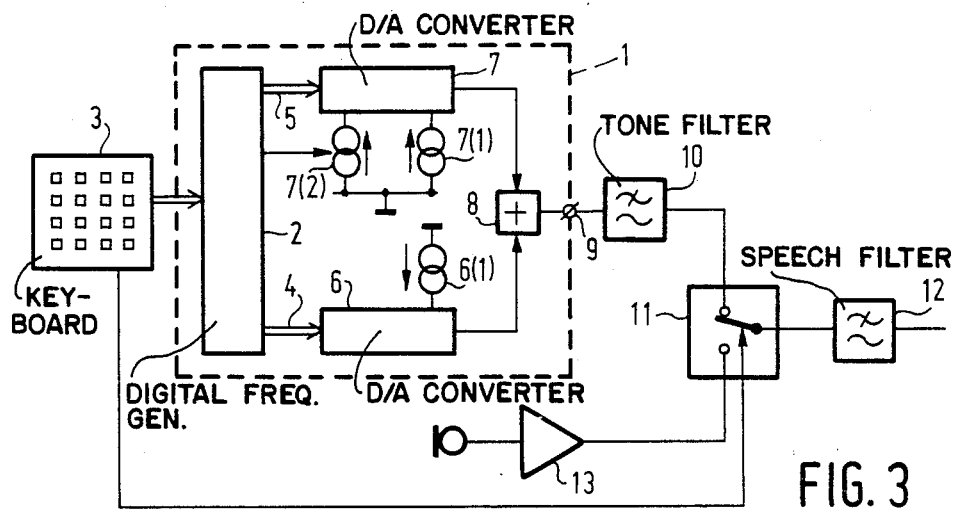
FIG. 3 shows an embodiment of the transmission circuit comprising an additional reference current source.

FIG. 3 shows preferred embodiment of the transmission circuit according to the invention. The circuit shown in this Figure is obtained by adding in the circuit shown in FIG. 1 an additional reference current source 7(2) to the digital-to-analog converter 7. This current source 7(2) is controlled by frequency generator 2. If frequency generator 2 produces the digital signal combinations which represent the tones of the second sub-group II(2), current source 7(2) is switched on. Current source 7(2) is in the switched-off state during the production of tones of the first sub-group II(1). The amplitude of the tones of the second sub-group II(2) is increased by this measure relative to the amplitude of the first sub-group II(1), as a result of which the variation of the attenuation characteristic of the series arrangement of the filters 10 and 12 is still further compensated for.

In practice, current source 7(1) is set to such a reference current value that the level of the dialling tones in group II is approximately 0.9 dB higher than the level of the dialling tones in group I, whilst current source 7(2) has such a current value that the level of the dialling tones in sub-group II(2) is additionally increased by approximately 0.7 dB.

What is claimed is:

1. A transmission circuit for a telephone set, comprising: a tone generator for generating two groups of dialling tones, the tones of the first group all having a lower frequency than the tones of the second group; a passive first-order low-pass tone filter directly connected to said tone generator; a microphone amplifier for amplifying a speech signal; a passive first-order low-pass speech filter for limiting the frequency band of the speech signal; and a switch for selectively connecting the input of the speech filter to the output of the tone filter or to the output of the microphone amplifier; and wherein the amplitude difference between the tones of the two tone groups caused by the frequency dependence of the attenuation of the series arrangement of the speech filter and the tone filter is compensated by the tone generator generating the tones of the second group with a higher amplitude than the tones of the first group.

2. A transmission circuit as claimed in claim 1, wherein: the second group of tones is divided into two sub-groups, the tones of a first sub-group all having a lower frequency than the tones of the second sub-group; and the amplitude difference between the tones of the two sub-groups caused by the frequency dependence of the attenuation of the series arrangement of the speech filter and the tone filter is further compensated by the tone generator generating the tones of the second sub-group with a higher amplitude than the tones of the first sub-group.

3. A transmission circuit as claimed in claim 1 wherein:
   the tone generator comprises a first digital-to-analog converter producing the first group of tones and a second digital-to-analog converter producing the second group of tones, each digital-to-analog converter includes a reference-current source which applies a predetermined reference current to the relevant digital-to-analog converter, the reference current determining the amplitude of the tones produced by the relevant digital-to-analog converters, and the tones of the second group are generated at a greater amplitude than the tones of the first group because the reference current source of the second digital-to-analog converter produces a higher reference current than the other reference current source.

4. A transmission circuit as claimed in claim 3, wherein:

the second digital-to-analog converter includes an additional reference-current source for applying an additional fixed reference current to the second digital-to-analog converter, and the tones of a second sub-group are generated at a greater amplitude than the tones of a first sub-group because the additional reference-current source is only switched on during the generation of the tones of the second sub-group.

5. A transmission circuit as claimed in claim 2, wherein:

the tone generator comprises a first digital-to-analog converter for producing the first group of tones and a second digital-to-analog converter for producing the second group of tones, each digital-to-analog converter includes a reference-current source which applies a predetermined reference current to the relevant digital-to-analog converter, the reference current determining the amplitude of the tones produced by the relevant digital-to-analog converters, and the tones of the second group are produced at a greater amplitude than the tones of the first group because the reference current source of the second digital-to-analog converter produces a higher reference current than the other reference current source.

6. A transmission circuit as claimed in claim 3, wherein:

the second digital-to-analog converter includes an additional reference-current source for applying an additional fixed reference current to the second digital-to-analog converter.

and the tones of a second sub-group are produced at a greater amplitude than the tones of a first sub-group because the additional reference-current source is only switched on during the generation of the tones of the second sub-group.

* * * * *